(12) United States Patent
Robichaux (10) Patent No.: US 6,814,140 B2
(45) Date of Patent: Nov. 9, 2004

(54) APPARATUS AND METHOD FOR INSERTING OR REMOVING A STRING OF TUBULARS FROM A SUBSEA BOREHOLE

(75) Inventor: Dicky Robichaux, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 244 days.

(21) Appl. No.: 10/169,781

(22) PCT Filed: Jan. 18, 2002

(86) PCT No.: PCT/GB02/00220

§ 371 (c)(1),
(2), (4) Date: Jul. 3, 2002

(87) PCT Pub. No.: WO02/057592

PCT Pub. Date: Jul. 25, 2002

(65) Prior Publication Data

US 2003/0019636 A1 Jan. 30, 2003

(51) Int. Cl.⁷ .......................... G21B 29/12; G21B 19/22
(52) U.S. Cl. ....................... 166/77.4; 166/383; 166/344; 166/339
(58) Field of Search ............................... 166/77.4, 339, 166/344, 383, 340

(56) References Cited

U.S. PATENT DOCUMENTS

| | | | |
|---|---|---|---|
| 3,096,075 A | 7/1963 | Brown | 254/29 |
| 3,215,203 A | 11/1965 | Sizer | 166/77 |
| 3,390,654 A | 7/1968 | Bromell et al. | 114/0.5 |
| 3,677,345 A | 7/1972 | Sizer | 166/315 |
| 3,703,111 A | 11/1972 | Guier | 81/57.34 |
| 3,913,669 A * | 10/1975 | Brun et al. | 166/349 |
| 3,999,610 A * | 12/1976 | Sage et al. | 166/383 |
| 4,085,796 A | 4/1978 | Council | 166/77.5 |
| 4,119,297 A * | 10/1978 | Gunther | 254/29 R |
| 4,162,704 A * | 7/1979 | Gunther | 166/77.53 |
| 4,176,722 A * | 12/1979 | Wetmore et al. | 175/7 |
| 4,208,158 A * | 6/1980 | Davies et al. | 414/22.68 |
| 4,401,164 A * | 8/1983 | Baugh | 166/379 |
| 4,417,624 A * | 11/1983 | Gockel | 166/351 |
| 4,421,175 A * | 12/1983 | Boyadjieff et al. | 166/383 |
| 4,476,936 A | 10/1984 | Boyadjieff et al. | 166/383 |
| 4,479,537 A * | 10/1984 | Reed | 166/77.4 |
| 4,479,547 A | 10/1984 | Boyadjieff et al. | 166/383 |

(List continued on next page.)

FOREIGN PATENT DOCUMENTS

WO    WO 01/33036    5/2001    ........... E21B/19/20

OTHER PUBLICATIONS

PCT International Search Report from Application PCT/GB02/00220, Dated May 16, 2002.
Great Britain Search Report from Application GB 0201138.5, Dated May 15, 2002.

Primary Examiner—Thomas B. Will
Assistant Examiner—Thomas A. Beach
(74) Attorney, Agent, or Firm—Moser, Patterson & Sheridan (57) ABSTRACT

A method and apparatus for inserting or removing a string of tubulars from a subsea borehole. The apparatus includes a first, lower, gripping mechanism locatable subsea in the vicinity of the subsea borehole. The first gripping mechanism is capable of gripping a portion of the string of tubulars. The apparatus further includes a second, upper, gripping mechanism locatable subsea in the vicinity of the subsea borehole, the second gripping mechanism being capable of-gripping a portion of the sting of tubulars. The first and second gripping mechanisms are moveable with respect to one another. The apparatus further includes a movement mechanism which, when actuated, moves one of the first and second gripping mechanisms with respect to the other of the first and second gripping mechanisms, such that the string of tubulars is inserted into or removed from the subsea borehole.

28 Claims, 7 Drawing Sheets

U.S. PATENT DOCUMENTS

| | | | | |
|---|---|---|---|---|
| 4,595,062 A | * | 6/1986 | Boyadjieff et al. | 166/379 |
| 4,702,320 A | * | 10/1987 | Gano et al. | 166/343 |
| 4,858,694 A | * | 8/1989 | Johnson et al. | 166/355 |
| 5,002,130 A | * | 3/1991 | Laky | 166/351 |
| 5,501,549 A | * | 3/1996 | Breda et al. | 405/169 |
| 5,566,772 A | * | 10/1996 | Coone et al. | 175/321 |
| 5,568,837 A | * | 10/1996 | Funk | 166/383 |
| 5,791,410 A | | 8/1998 | Castille et al. | 166/77.1 |
| 6,047,781 A | * | 4/2000 | Scott et al. | 175/5 |
| 6,276,454 B1 | * | 8/2001 | Fontana et al. | 166/343 |
| 6,296,066 B1 | * | 10/2001 | Terry et al. | 175/92 |
| 6,347,665 B2 | * | 2/2002 | Rogers | 166/77.51 |
| 6,412,560 B1 | * | 7/2002 | Bernat | 166/301 |

* cited by examiner

APPARATUS AND METHOD FOR INSERTING OR REMOVING A STRING OF TUBULARS FROM A SUBSEA BOREHOLE

BACKGROUND OF THE INVENTION

1. Field of the Invention

The present invention relates to an apparatus and method, particularly, but not exclusively, for use with increasing the speed of tripping into or out of a subsea well on a floating production platform or vessel used in the exploration, exploitation and production of hydrocarbons. Particularly, the apparatus and method is for use in workovers, well maintenance and well intervention in subsea wells, but could also relate to other uses such as water exploration, exploitation and production.

2. Description of the Related Art

Conventional drilling operations for hydrocarbon exploration, exploitation and production utilize many lengths of individual tubulars (or OCTG products) which are made up into a string, where the tubulars are connected to one another by means of screw threaded couplings provided at each end. Various operations require strings of different tubulars, such as drillpipe, casing and production tubing. The individual tubular sections are made up into the required string on the drilling rig or floating production vessel, etc., by inserting them into the subsea surface well through a riser which extends from the subsea surface up to the drilling rig. A make up/breakout unit adds or removes an individual tubular section from the required string. Conventionally, this is a relatively time consuming task, since the string must be held in conventional slips located on the drilling rig whilst e.g. a new tubular is included in the top of the string on the drilling rig. In addition, conventional drilling rigs, such as jack ups, floating drilling rigs and drill ships are relatively expensive both in terms of manpower and rental rates which may be in the region of 100 men and U.S.$200,000 per day respectively.

SUMMARY OF THE INVENTION

According to a first aspect of the present invention there is provided an apparatus for inserting or removing a string of tubulars from a sub-sea borehole, the apparatus comprising:

a first, lower, gripping mechanism located subsea in the vicinity of the subsea borehole, the first gripping mechanism being capable of gripping a portion of the string of tubulars;

a second, upper, gripping mechanism located subsea in the vicinity of the subsea borehole, the second gripping mechanism being capable of gripping a portion of the string of tubulars;

wherein the first and second gripping mechanisms are moveable with respect to one another; and a movement mechanism which, when actuated, moves one of the first and second gripping mechanisms with respect to the other of the first and second gripping mechanisms, such that the string of tubulars is inserted into or removed from the subsea borehole.

According to a second aspect of the present invention there is provided a method of inserting or removing a string of tubulars from a sub-sea borehole, the method comprising:

providing a first gripping mechanism subsea in the vicinity of the subsea borehole, the first gripping mechanism being capable of gripping a portion of the string of tubulars;

providing a second gripping mechanism located subsea in the vicinity of the subsea borehole, the second gripping mechanism being capable of gripping a portion of the string of tubulars;

wherein the first and second gripping mechanisms are moveable with respect to one another;

providing a movement mechanism which is capable of moving one of the first and second gripping mechanisms with respect to the other of the first and second gripping mechanisms; and actuating the movement mechanism such that the string of tubulars is inserted into, or removed from, the subsea borehole.

Preferably, the first gripping mechanism is lower than the second gripping mechanism, and more preferably, the first gripping mechanism is substantially stationary with respect to the mouth of the subsea borehole, and the second, upper, gripping mechanism is moved with respect to the first gripping mechanism.

Typically, the second, upper, gripping mechanism is operated to grip the string of tubulars whilst the movement mechanism is actuated, and when this is the case, the first, lower, gripping mechanism is preferably not actuated such that the first, lower, gripping mechanism does not grip the string of tubulars.

Preferably, the first, lower, gripping mechanism is operated to grip the string of tubulars when the second, upper, gripping mechanism is not operated to grip the string of tubulars.

Typically, the movement mechanism comprises a jacking mechanism including a piston cylinder and a piston located within the piston cylinder, wherein one of the first and second gripping mechanisms is secured to the piston and the other of the first and second gripping mechanisms is secured to the piston cylinder. Preferably, the jacking mechanism is operated by introducing fluid into, or removing fluid from, one side of the piston within the piston cylinder. Preferably, a fluid reservoir, which is preferably a high pressure fluid reservoir, is provided to introduce fluid into, or remove fluid from, one side of the piston within the piston cylinder, and more preferably, the fluid reservoir is located subsea, typically in close proximity to the jacking mechanism.

Preferably, the jacking mechanism and first and second gripping means are all located vertically above, and typically in line with, a subsea equipment package which includes at least a subsea blow-out preventor (BOP).

Preferably, there is further provided a make up/break out mechanism which is capable of adding a tubular to or removing a tubular from the string. Typically, there is further provided a handling mechanism which is adapted to deliver a tubular into, or remove a tubular from, the make up/break out mechanism. Preferably, the make up/break out mechanism, and typically the handling mechanism is/are located on a vessel at the sea surface, where the vessel is typically located substantially vertically above the apparatus located subsea. Typically, a compensation mechanism is provided to compensate the make up/break out mechanism for movement of the vessel in the sea, typically in a direction parallel to the axial direction of the string, such that the string may be substantially continuously inserted into or removed from the borehole.

Typically, the make up/breakout mechanism further comprises a pair of vertically spaced tongs which are adapted to selectively grip the tubulars. More preferably, the uppermost tong is adapted to impart rotation to a tubular.

Typically, a riser is further provided into an upper end of which the string is inserted into at the vessel. The lower end of the riser may be sealed with respect to the sea or may be open with respect to the sea.

A control system is preferably provided to control actuation of the first and second gripping mechanisms and preferably also the jacking mechanisms. Typically, the fluid reservoir is charged up from a pump located on the vessel.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Embodiments of the present invention will now be described, by way of example only, with reference to the accompanying drawings, in which.

DETAILED DESCRIPTION OF THE PREFERRED EMBODIMENT

Figure 1:
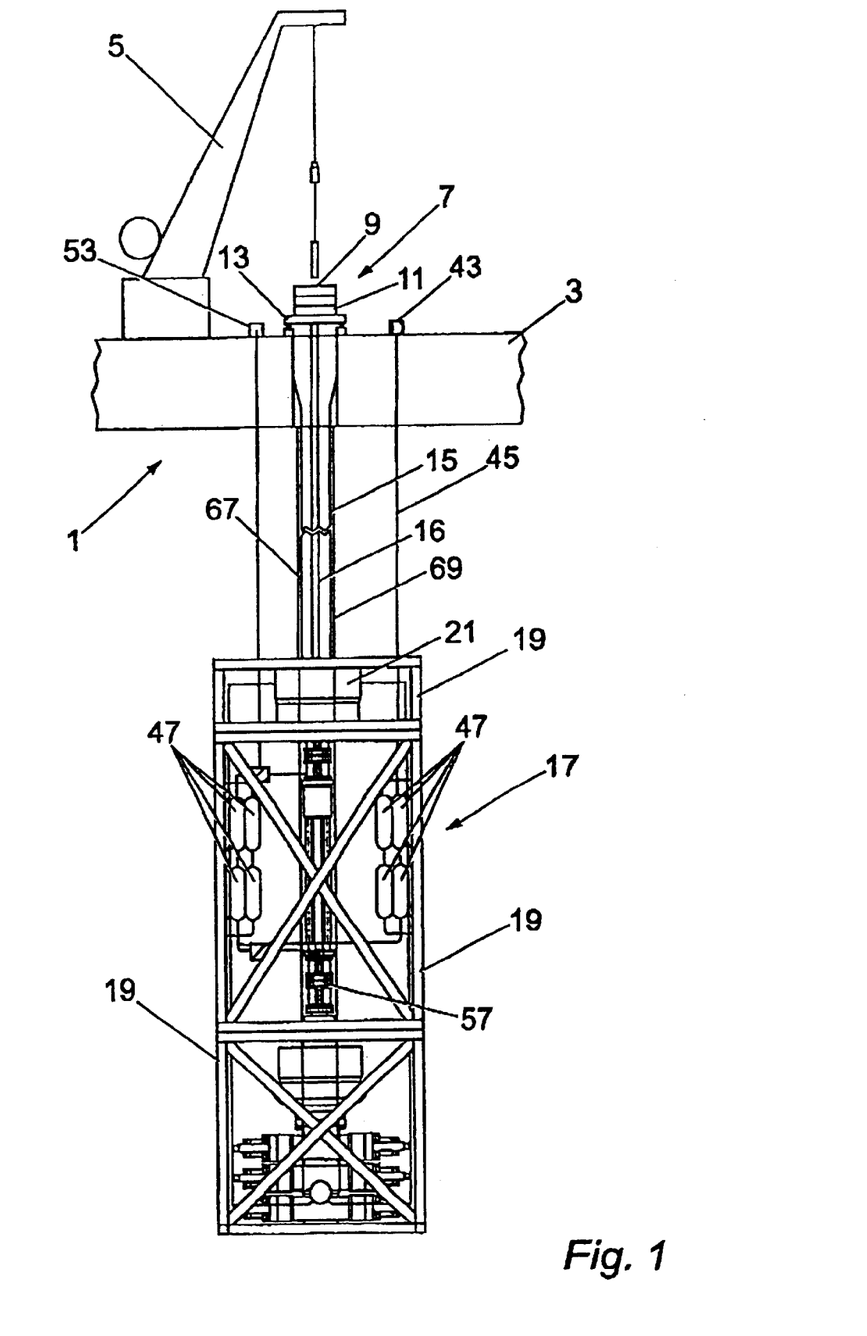
FIG. 1 is a schematic view of a first embodiment of an apparatus in accordance with the present invention.

FIG. 1 shows an apparatus 1 in accordance with the present invention. A support vessel 3 such as a floating drilling rig or other floating vessel is located substantially vertically above a hydrocarbon borehole (not shown) and is typically either dynamically positioned over the particular well by means of conventional thrusters for example or is moored by conventional means over the required well. The support vessel 3 comprises a conventional crane or derrick 5 and is further provided with a make up/breakout unit generally shown at 7. The make up/breakout unit 7 comprises an upper tong 9 and a lower tong 11, which may preferably be a lower rotary back-up 11. The reader is directed towards our co-pending British Patent Application No 0004354.7 and PCT Application No GB 00/04241 for further details of a suitable make up/break out unit 7. In summary, the upper tong 9 provides means to make up and breakout tubing, casing or drillpipe 16 during tripping and snubbing operations, and is hydraulically powered. The upper tong 9 comprises three sliding jaws. (not shown) which virtually encircle the tubular 16 to maximize torque whilst minimizing marking and damage and is provided with a cam operated jaw system (not shown) which can be operated to allow passage of workstring tool joints as well as tubing casing couplings. The upper tong 9 is powered by hydraulic motors (not shown) which provide speeds and torque capable of spinning and making/breaking high torque connections.

The lower tong or rotary back-up 11 generally has two functions. During drilling operations, the rotary back-up 11 generates the torque required for high speed milling and drilling. This torque is transferred to the outer diameter of the string 16 by means of three sliding jaws (not shown). During tripping operations, the jaws of the rotary back-up 11 are activated to grip the lower tubular 16 in the make up/breakout unit 7 (i.e. the tubular that is already included in the string 16) and resist the torque generated by the upper tong 9 when making up or breaking out the tubular connections.

The make up/breakout unit 7 is mounted on the support vessel 3 by means of tong table compensator 13 which moves the make up/breakout unit 7 with respect to the support vessel 3, such that the make up/breakout unit 7 is substantially stationary with respect to the subsea surface. Thus, the tong table compensator 13 compensates for the action of the wave motion upon the support vessel 3. The heave of the support vessel 3 due to the ocean waves may be in the. region of 10 to 15 feet, and the stroke of the compensator table 13 substantially matches the heave of the support vessel 3, such that the make up/breakout unit is stationary with respect to the subsea equipment 17.

A riser 15 extends downwardly from the support vessel 3 wherein the upper end of the riser 15 is located substantially immediately below the tong table compensator 13, although the lower end of the riser 15 could be offset from the upper end of the riser 15 as is known in the art. The riser 15 extends downwardly towards subsea equipment 17 of the apparatus 1.

The subsea equipment 17 comprises an outer frame 19 which is suitably provided with sufficient strength bearing members in the form of struts, braces, etc.

The subsea equipment 17 comprises a subsea annular seal 21 or lower riser seal 21 which is provided at the upper, in use, end of the frame 19. The lower end of the riser 15 is located within the lower riser seal 21, such that the outer surface of the lower end of the riser 15 is sealed to the sea water by the lower riser seal 21.

A set of travelling slips 23 are mounted upon a passive rotary bearing 25. The rotating portion of the passive rotary bearing 25 supports the traveling slips 23, and allows the travelling slips 23 to rotate with respect to the non-rotating portion of the passive rotary bearing 25. The purpose of the travelling slips 23 will be described subsequently.

Figure 2:
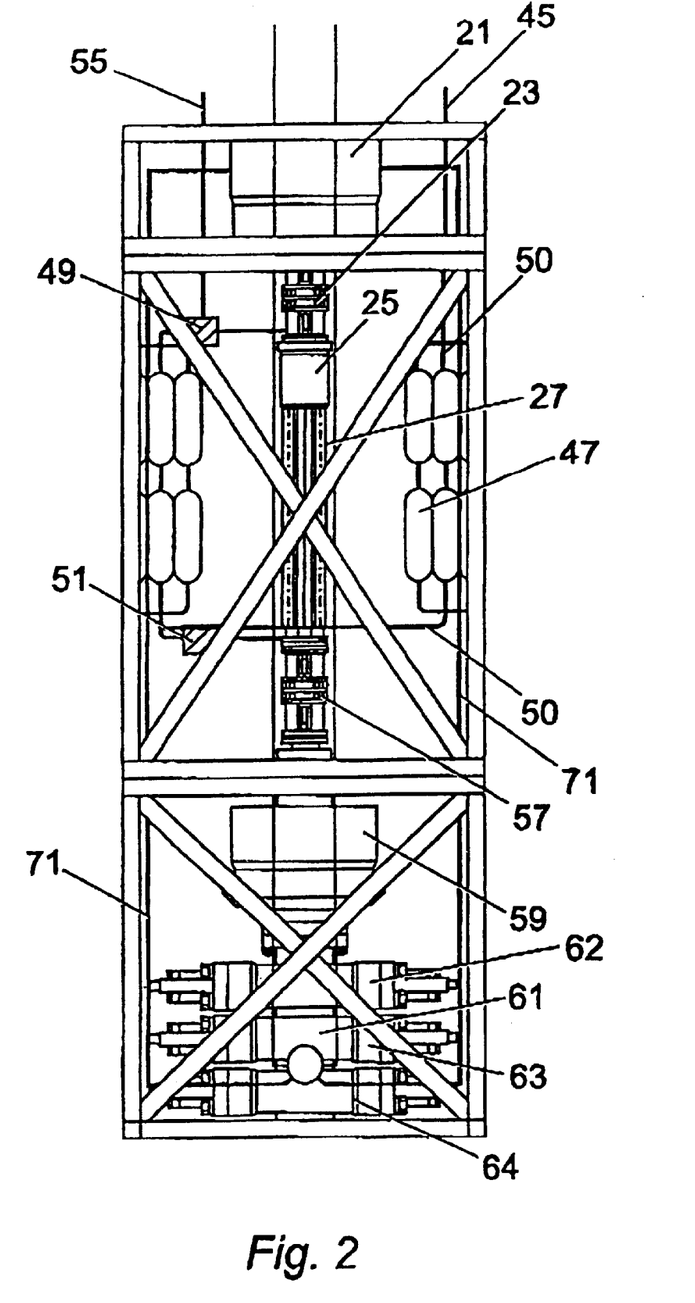
FIG. 2 is a detailed view of a portion of the apparatus shown in FIG. 1.
Figure 3:
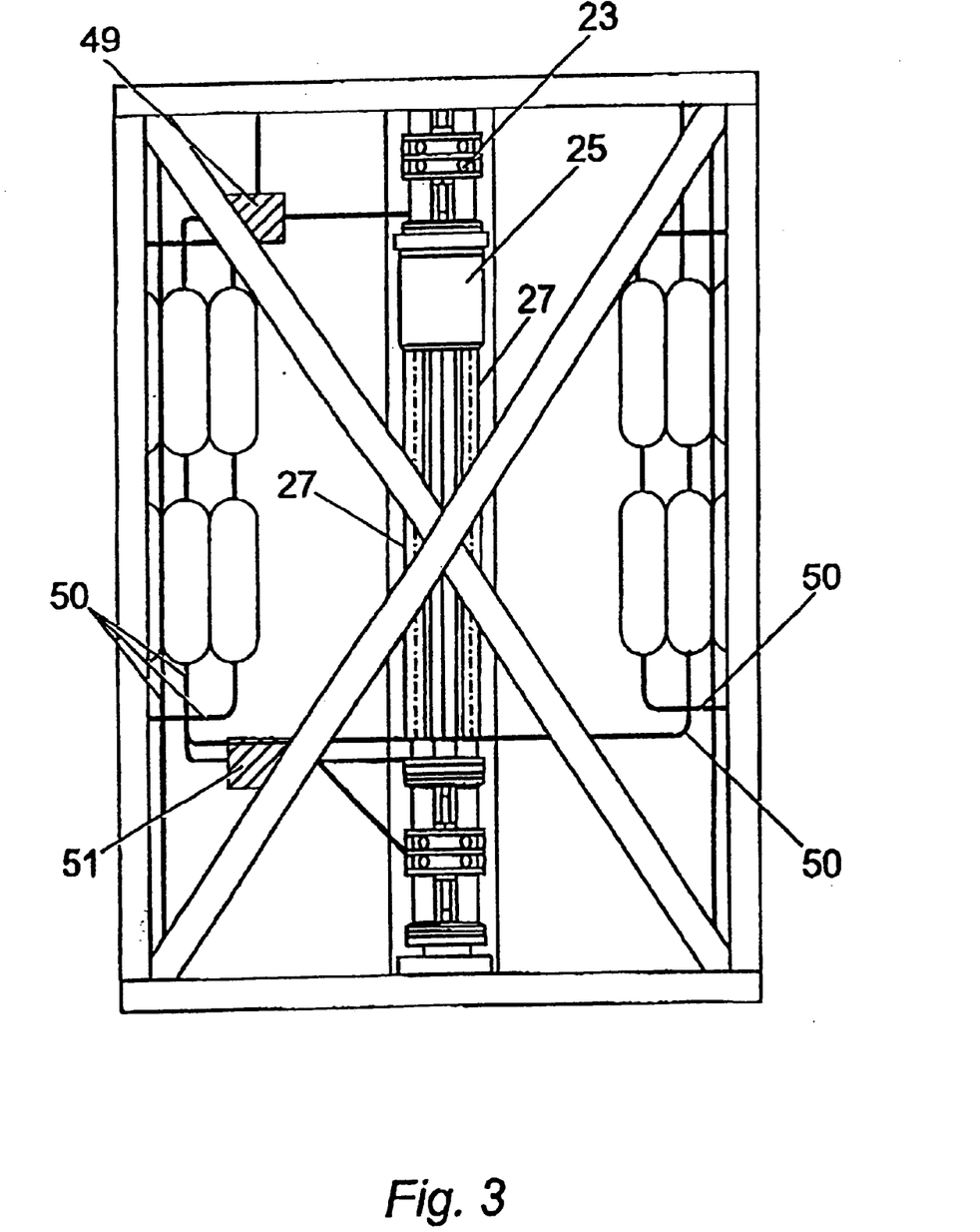
FIG. 3 is a further detailed view of a portion of the apparatus shown in FIG. 1.

The lower end of the passive rotary bearing 25 is mounted to the upper end of a hydraulic jack system 27, as can be more clearly seen in FIG. 2 and particularly FIG. 3.

Figures 4A, 4B, 4C:
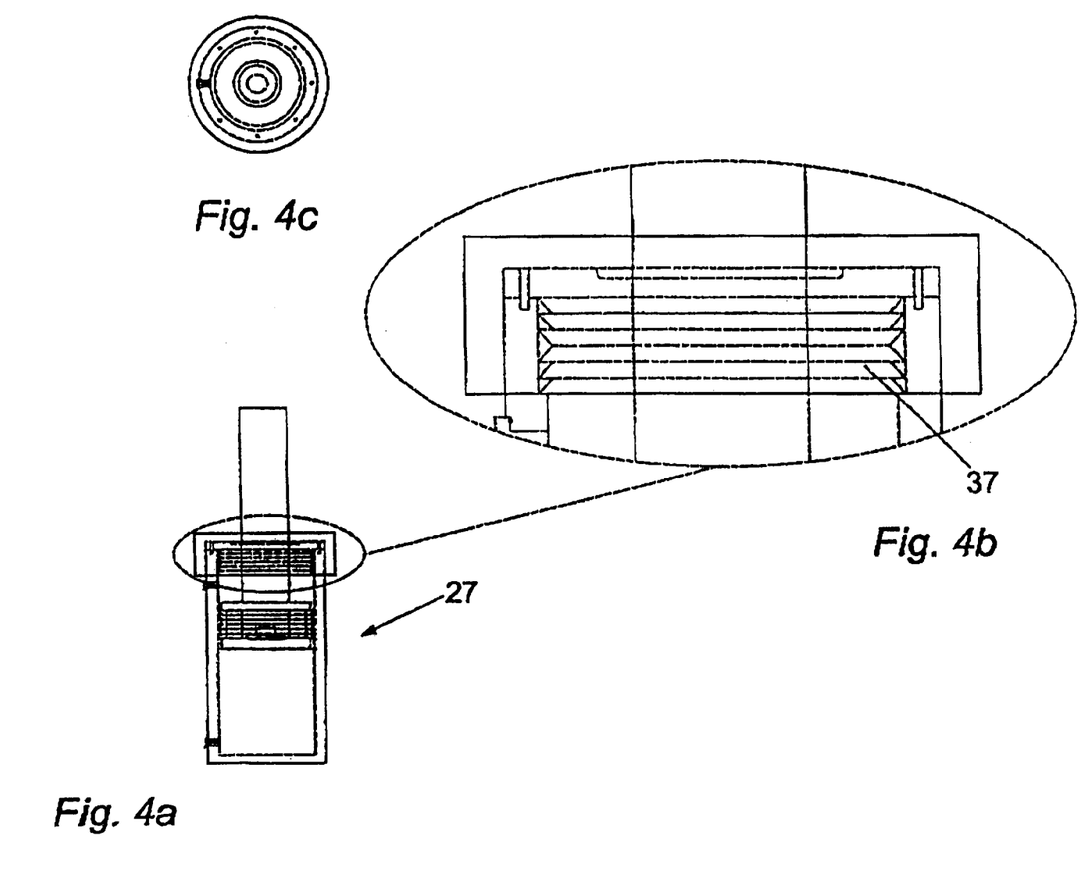
FIG. 4(a) is a cross-sectional side view of a portion of a hydraulic jacking system incorporated in the apparatus of FIG. 1.
FIG. 4(b) is a more detailed cross-sectional view of a portion of the hydraulic jacking system shown in FIG. 4(a)
FIG. 4(c) is a plan view of the hydraulic jacking system shown in FIG. 4(a)
Figure 5:
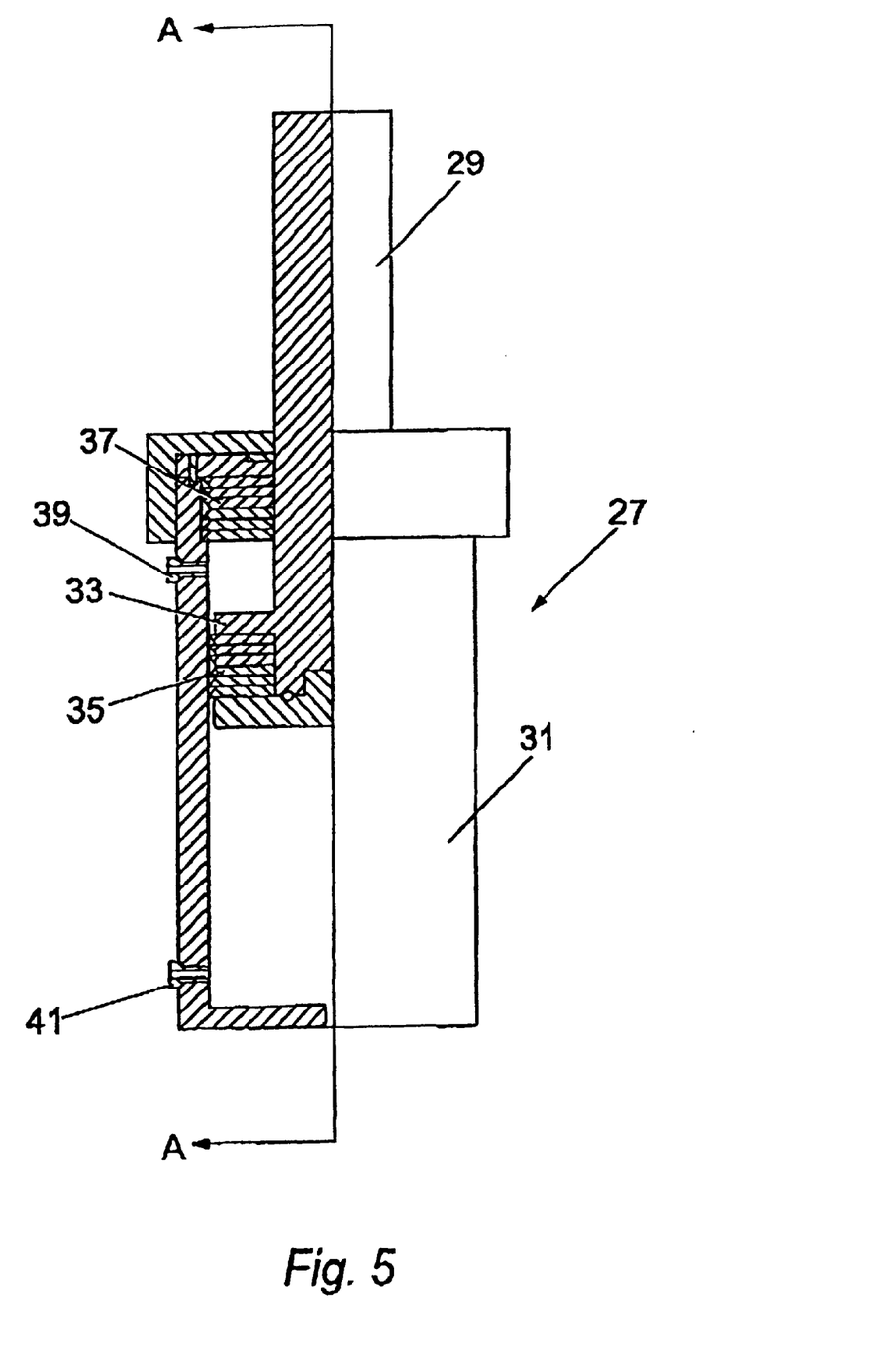
FIG. 5 is a cross-sectional view of the hydraulic jacking system shown in FIGS. 4(a)–(c)

There are at least a pair of hydraulic jacks 27, and more preferably four hydraulic jacks 27 mounted equi-distantly spaced around a central region through which a tubing string 16 can pass. Each hydraulic jack 27 comprises a piston 29 and cylinder 31 arrangement. The piston 29 comprises a piston head 33 at its lower end, and the outer radial surface of the piston head 33 is sealed with respect to the inner surface of the cylinder 31 by means of a set of "V" seal packings 35. The packings 35 shown in FIGS. 4(a) to 4(c) comprise an upper set of three seals arranged to seal in the direction from above the piston head 33, and hence seal against the subsea hydrostatic pressure, and a lower set of three seals arranged to seal in the direction from below the piston head 33 and hence seal against the hydraulic fluid pressure within the cylinder 31; however, it should be noted that more than, or less than, three seals can be provided in the upper and/or lower sets of seals. A second set of "V" seal packing 37 acts between the longitudinal body of the piston 29 and the upper end of the cylinder 31, and acts to prevent the hydrostatic pressure of sea water from outside of the cylinder 31 from entering the interior of the cylinder 31. An upper hydraulic port 39 is provided within a side wall of the cylinder 31 toward the upper end thereof, and a lower hydraulic port 41 is provided in the side wall toward the lower end of the cylinder 31, such that the hydraulic ports 39, 41 provide access to the interior of the cylinder 31.

A hydraulic fluid control system for providing pressurised hydraulic fluid to the cylinders 31 in a controlled and selective manner is also provided as will now be described. A hydraulic fluid charge pump 43 is provided on the support vessel 3 and is capable of providing/maintaining pressurised hydraulic fluid to an arrangement of hydraulic fluid accumulators 47, mounted on the frame 19, via hydraulic fluid line 45. The accumulators 47 act as high pressure hydraulic fluid reservoirs subsea, and are interconnected via upper 49 and lower 51 valve manifolds and a network of hydraulic lines 50. The valve manifolds 49, 51 are operated by an operator on the support vessel by means of a control console 53 via a control line 55. The control console 53 and hence control line 55 may be electrically or hydraulically powered. Accordingly, operation of the control console 53 in the prescribed manner by the operator can raise or lower the hydraulic jacks 27 by injection of pressurised hydraulic fluid into the respective upper or lower hydraulic ports 39, 41.

The lower end of the cylinder 31 of hydraulic jacks 27 is mounted to the upper end of a set of stationary slips 57 which can be operated from the support vessel 3 to selectively grip and hence support the tubing string 16. The set of stationary slips 57 are substantially the same as a conventional set of stationary slips (previously in the prior art only used above the sea surface), although they will likely require modification for use subsea as in the present invention.

The stationary slips 57 are mounted to the upper end of a subsea stack 59 which is mounted directly above a blowout preventor (BOP) 61, which as is conventional, comprises an upper set of rams 62 for emergency sealing about the tubing string 16, a middle set of shear rams 63 which are capable of cutting through the tubing string 16, and a lower set of pipe rams 64 which can be operated in an emergency to seal around the tubing string 16; the BOP is only operated in the event of an emergency in order to seal off the wellbore located below the SOP 61.

Conventional choke 67 and kill 69 lines run from the support vessel 3 down to the SOP 61, and are strapped to the riser 15.

It should be noted that with the apparatus 1 as shown in FIGS. 1 to 5, there is a further fluid tank (not shown) located on the support vessel 3, and due to the presence of the lower riser seal 21, it is possible to fill the annulus between the inner circumference of the riser and the outer circumference of the tubing/drillstring 16 with fluid supplied from the fluid tank which provides the advantage that the riser is prevented from collapsing due to the hydrostatic pressure of the ocean. In addition, communication lines 71 connect the wellbore, via the SOP 61, to the inner circumference of the lower riser seal 21 and hence the communication lines 71 provide communication between the wellbore and the riser 15. This provides the advantage that if a severe gas kick is experienced from the wellbore, the fluid in the tank will rise, and an operator or a sensor on the support vessel 3 can observe this rise in fluid level in the tank and operate the SOP stack 61 to close the wellbore. In addition, the advantage is provided that if a drilling operation is being conducted through a formation which is relatively low in pressure, the fluid in the riser will quickly drain into the formation and hence the fluid level in the tank will sharply fall and in this scenario the operator can also operate the SOP stack 61 to close the wellbore whilst remedial work can be conducted.

Figure 6:
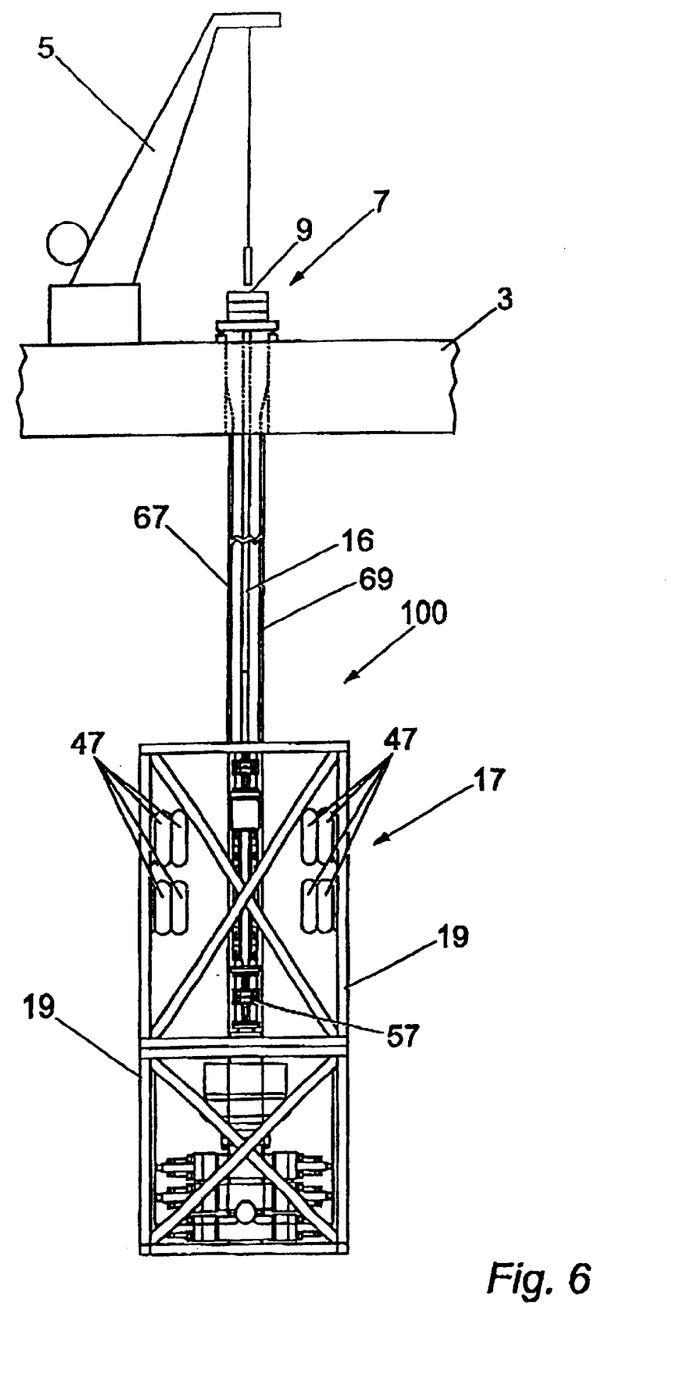
FIG. 6 is a second embodiment of an apparatus in accordance with the present invention.
Figure 7:
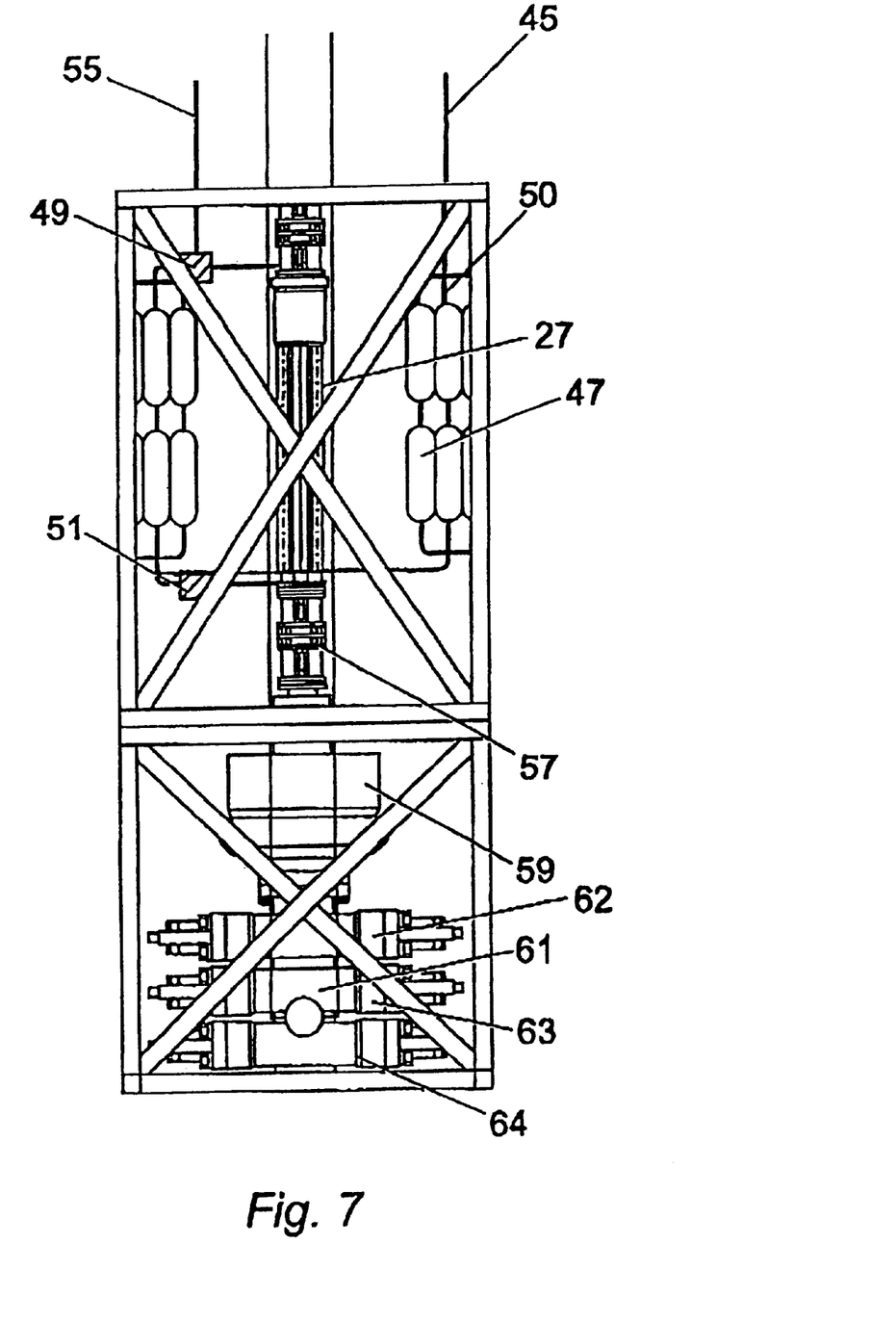
FIG. 7 is a schematic view of a portion of the apparatus shown in FIG. 6.

Alternatively, and as shown in the second embodiment of apparatus 100 disclosed in FIG. 6 and FIG. 7, it is possible to omit the lower riser seal 21, such that the annulus between the outer circumference of the tubing/drillstring 16 and the inner circumference of the riser 15 is filled with sea water in order to prevent the riser 15 from collapsing. In the apparatus 100, the lower end of the riser 15 secures to a flange located at the uppermost portion of the frame 19, and will thus be open to the sea water. However, the embodiment as shown in FIGS. 1 to 5 is preferred since this provides the advantage that the operator can view the result of the wellbore pressure. In all other respects, the apparatus 100 as shown in FIGS. 6 and 7 is identical with the apparatus 1 as shown in FIGS. 1 to 5.

Operation of the apparatus of FIG. 1 will now be described in relation to a drilling operation, but those experienced in the art will appreciate that apparatus 1 can be operated for a host of other operations, such as well intervention, for example. In particular, as those skilled in the art will appreciate, if a through (production) tubing operation is to be performed, the production tree (not shown) is left in place at the mouth of the wellbore, and the frame 19 including the subsea stack 59 and SOP 61 are lowered from the vessel 3 and coupled to the production tree. However, if a full workover operation is to be conducted, the production tubing (not shown) is removed from the wellbore, with the appropriate plugs (not shown) having been placed into the wellbore, and thereafter the frame 19 including the subsea stack 59 and SOP 61 are lowered from the vessel 3 and coupled to the mouth of the wellbore. It should also be noted that the apparatus 100 is operated in a similar manner to the apparatus 1, with the exception that the lower seal riser 21 is not present in the apparatus 100.

The tubing string 16, in this case the drillstring 16, is progressively made up in the upper tong 9 and lower rotary back-up 11 and is lowered into the well by the crane 5 and associated winch, with successive drillpipe being included in the drillstring 16. The drillstring 16 first enters the riser 15 and continues downwards until it enters the lower riser seal 21. The lower end of the drillstring 16 then enters the bore of the travelling slips 23, at which point the travelling slips 23 are actuated to securely grip the lower end of the drillstring 16. The hydraulic jack 27 is then operated by an operator at the control console 53, such that the hydraulic jacks 27 are lowered. Hence, the travelling slips 23 take the weight of the drillstring 16. The jacks 27 continue to be lowered until the lower end of the drillstring passes through the stationary slips 57, at which point movement of the hydraulic jacks 27 is halted and the stationary slips 57 are actuated to securely grip the lower end of the drillstring 16. The travelling slips 23 are then disengaged from gripping the drillstring 16 and hence the weight of the drillstring 16 is held by the stationary slips 57. The jacks 27 can then be actuated in the reverse direction, that is to lift the travelling slips 23 upwards until the jacks 27 have reached their full stroke and the travelling slips 23 can then be actuated once again to grip the next section of drillstring 16; thereafter the stationary slips 57 engagement of the drill string 16 is released.

By repeating this operation, the drillstring 16 can be inserted into the wellbore in a much faster manner than achieved using conventional methods.

In order to retrieve the drillstring 16 from the wellbore, the apparatus is operated in the reverse direction to that described above, and again, the drillstring 16 can be removed from the wellbore in a manner much quicker than is capable of being achieved with conventional methods.

The subsea equipment 17, including the frame 19, subsea stack 59 and SOP 61 can then be retrieved to the vessel 3, after the wellbore has been suitably sealed. Alternatively, if a through (production) tubing operation has been performed, the production tree is left in place at the mouth of the wellbore, and the subsea equipment 17 is de-coupled from the production tree and is retrieved to the vessel. However, if a full workover operation has been conducted, the subsea equipment 17 is de-coupled from the wellbore and is retrieved to the vessel; the production tree is then reinserted in the wellbore mouth, and the appropriate plugs can also then be removed.

The embodiments described herein provide the great advantage that most support vessels currently used in the offshore oil and gas industry can be used for such operations with relatively minimal conversion being required, which results in substantial cost and manpower savings. In addition, there is only a very limited supply of jack up rigs available, which means that such operations must wait until a suitable vessel is available; the embodiments described herein substantially increase the number of vessels available in the world capable of performing such operations.

Modifications and improvements may be made to the embodiments herein described, without departing from the scope of the invention.

What is claimed is:

1. An apparatus for inserting or removing a string of tubulars from a subsea borehole, the apparatus comprising:
    a first, lower, gripping mechanism for use in a location subsea in the vicinity of the subsea borehole, the first gripping mechanism being capable of gripping a portion of the string of tubulars;
    a second, upper, gripping mechanism for use in a location subsea in the vicinity of the subsea borehole, the second gripping mechanism being capable of gripping a portion of the string of tubulars;
    wherein the first and second gripping mechanisms are moveable with respect to one another;
    a movement mechanism which, when actuated, moves one of the first and second gripping mechanisms with respect to the other of the first and second gripping mechanisms, such that the string of tubulars is inserted into or removed from the subsea borehole;
    a make up/break out mechanism configured to one of add a tubular to and remove a tubular from the string; and
    a compensation mechanism configured to keep the make up/breakout mechanism substantially stationary with respect to a subsea surface.

2. An apparatus as claimed in claim 1 wherein the first gripping mechanism is lower than the second gripping mechanism.

3. An apparatus as claimed in claim 2 wherein the first gripping mechanism is adapted to be substantially stationary with respect to the mouth of the subsea borehole, and the second upper gripping mechanism is moveable with respect to the first gripping mechanism.

4. An apparatus as claimed in claim 1 wherein the movement mechanism comprises a jacking mechanism including a piston cylinder and a piston located within the piston cylinder, and one of the first and second gripping mechanisms is secured to the piston and the other of the first and second gripping mechanisms is secured to the piston cylinder.

5. An apparatus as claimed in claim 4 wherein the jacking mechanism is operable by introducing fluid into, or removing fluid from, one side of the piston within the piston cylinder.

6. An apparatus as claimed in claim 5 further comprising a fluid reservoir to introduce fluid into, or remove fluid from, one side of the piston within the piston cylinder.

7. An apparatus as claimed in claim 6 wherein the fluid reservoir comprises a high pressure fluid reservoir.

8. An apparatus as claimed in claim 1 wherein the fluid reservoir is locatable subsea.

9. An apparatus as claimed in claim 8 wherein the fluid reservoir is disposed in close proximity to the jacking system.

10. An apparatus as claimed in claim 1 wherein the jacking mechanism and first and second gripping means are locatable vertically above a subsea equipment package.

11. An apparatus as claimed in claim 10 wherein the jacking mechanism and first and second gripping means are locatable in line with the subsea equipment package.

12. An apparatus as claimed in claim 1 further comprising a make up/break out mechanism which is capable of adding a tubular to or removing a tubular from the string.

13. An apparatus as claimed in claim 12 comprising a handling mechanism adapted to deliver a tubular into, or remove a tubular from, the make up/break out mechanism.

14. An apparatus as claimed in claim 1 further comprising a compensation mechanism to compensate the make up/break out mechanism for movement of a vessel in the sea.

15. An apparatus as claimed in claim 14 wherein the compensation mechanism is adapted to compensate for movement of the vessel in a direction parallel to the axial direction of the string, such that the string may be substantially continuously inserted into or removed from the borehole.

16. An apparatus for inserting or removing a string of tubulars from a subsea borehole, comprising:
    a first, lower, gripping mechanism for use in a location subsea in the vicinity of the subsea borehole, the first gripping mechanism being capable of gripping a portion of the string of tubulars;
    a second, upper, gripping/mechanism for use in a location subsea in the vicinity of the subsea borehole, the second gripping mechanism being capable of gripping a portion of the string of tubulars, wherein the first and second gripping mechanisms are moveable with respect to one another;
    a movement mechanism which, when actuated, moves one of the first and second gripping mechanisms with respect to the other of the first and second gripping mechanisms such that the string of tubulars is inserted into or removed from the subsea borehole; and
    a make up/breakout mechanism capable of adding a tubular to or removing a tubular from the string, wherein the make up/break out mechanism comprises a pair of vertically spaced tongs which are adapted to selectively grip the tubular.

17. An apparatus as claimed in claim 16 wherein an uppermost tong of the vertically spaced tongs is adapted to impart rotation to the tubular.

18. An apparatus for inserting or removing a string of tubulars from a subsea borehole, comprising:
    a first, lower, gripping mechanism for use in a location subsea in the vicinity of the subsea borehole, the first gripping mechanism being capable of gripping a portion of the string of tubulars;

a second, upper, gripping mechanism for use in a location subsea in the vicinity of the subsea borehole, the second gripping mechanism being capable of gripping a portion of the string of tubulars, wherein the first and second gripping mechanisms are moveable with respect to one another;

a movement mechanism which, when actuated, moves one of the first and second gripping mechanisms with respect to the other of the first and second gripping mechanisms such that the string of tubulars is inserted into or removed from the subsea borehole; and a riser into which an upper end of a string is insertable at a vessel.

19. An apparatus as claimed in claim 18 wherein the lower end of the riser is sealable with respect to the sea.

20. An apparatus as claimed in claim 1 further comprising a control system to control actuation of the first and second gripping mechanisms.

21. An apparatus as claimed in claim 20 wherein the control system is adapted to control the jacking mechanism.

22. An apparatus as claimed in claim 1 wherein the fluid reservoir is chargeable from a pump located on a vessel.

23. A method of inserting or removing a string of tubulars from a subsea borehole, the method comprising:

providing a first gripping mechanism located subsea in the vicinity of the subsea borehole, the first gripping mechanism being capable of gripping a portion of the string of tubulars;

providing a second gripping mechanism located subsea in the vicinity of the subsea borehole, the second gripping mechanism being capable of gripping a portion of the string of tubulars;

wherein the first and second gripping mechanisms are moveable with respect to one another;

providing a movement mechanism which is capable of moving one of the first and second gripping mechanisms with respect to the other of the first and second gripping mechanisms;

actuating the movement mechanism such that the string of tubulars is inserted into, or removed from, the subsea borehole;

providing a make up/breakout mechanism for one of adding a tubular to the string and removing the tubular from the string; and providing a compensation mechanism for keeping the make up/breakout mechanism substantially stationary with respect to a subsea surface.

24. A method as claimed in claim 23 wherein the first gripping mechanism is lower than the second gripping mechanism.

25. A method as claimed in claim 23 wherein the first gripping mechanism is substantially stationary with respect to the mouth of the subsea borehole, and the second, upper, gripping mechanism is moved with respect to the first gripping mechanism.

26. A method as claimed in claim 25 wherein the second, upper, gripping mechanism is operated to grip the string of tubulars whilst the movement mechanism is actuated.

27. A method as claimed in claim 26 wherein the first, lower, gripping mechanism is not actuated such that the first, lower, gripping mechanism does not grip the string of tubulars.

28. A method as claimed in claim 27 wherein the first, lower, gripping mechanism is operated to grip the string of tubulars when the second, upper, gripping mechanism is not operated to grip the string of tubulars.

* * * * *